United States Patent [19]

Matsuzaki et al.

[11] Patent Number: 5,452,404
[45] Date of Patent: Sep. 19, 1995

[54] DATA PROCESSING SYSTEM FOR AUTOMATICALLY CHANGING PRINTING MODES IN RESPONSE TO STORED COMMANDS

[75] Inventors: Hideo Matsuzaki, Tokyo; Masaru Makita, Yokohama, both of Japan

[73] Assignee: Canon Kabushiki Kaisha, Tokyo, Japan

[21] Appl. No.: 208,189

[22] Filed: Mar. 10, 1994

Related U.S. Application Data

[60] Continuation of Ser. No. 904,682, Jun. 26, 1992, abandoned, which is a division of Ser. No. 477,153, Feb. 8, 1990, Pat. No. 5,155,804, which is a continuation of Ser. No. 357,625, May 25, 1989, abandoned, which is a continuation of Ser. No. 929,496, Nov. 12, 1986, abandoned.

[30] Foreign Application Priority Data

Nov. 18, 1985 [JP] Japan .................. 60-256605

[51] Int. Cl.$^6$ .............................. G06F 3/00
[52] U.S. Cl. .................. 395/112; 395/146; 364/936; 364/943.4; 364/943.43; 364/943.44; 364/DIG. 2
[58] Field of Search .............. 395/101–108, 395/112, 800, 144–151

[56] References Cited

U.S. PATENT DOCUMENTS

| | | | |
|---|---|---|---|
| 3,786,429 | 1/1974 | Goldman et al. | 400/83 |
| 3,823,393 | 7/1974 | Norris | 364/419 |
| 3,932,842 | 1/1976 | Kennavane | 364/900 |
| 4,247,906 | 1/1981 | Corwin et al. | 364/706 |
| 4,392,197 | 7/1983 | Couper et al. | |
| 4,491,933 | 1/1985 | Ursin et al. | 364/900 |
| 4,497,589 | 2/1985 | Figini | 400/61 |
| 4,548,520 | 10/1985 | Ueno | 400/63 |
| 4,564,301 | 1/1986 | Ueno | 400/63 |
| 4,607,966 | 8/1986 | Ueno et al. | 400/63 |
| 4,639,151 | 1/1987 | Ueno et al. | 400/63 |
| 4,737,924 | 4/1988 | Miki | 395/108 |
| 4,825,389 | 4/1989 | Masaki | 395/108 |
| 4,837,737 | 6/1989 | Watanabe | 364/419 |
| 4,949,283 | 8/1990 | Yamauchi et al. | 395/101 |
| 5,068,824 | 11/1991 | Kreutzburg et al. | 395/800 |

FOREIGN PATENT DOCUMENTS 0117892 9/1984 European Pat. Off. .
2156112 2/1985 United Kingdom .

OTHER PUBLICATIONS

VT102 Video Terminal User Guide, Copyright 1981, 1982 by Digital Equipment Corporation.
IBM Technical Disclosure Bulletin, vol. 25, No. 11A, Apr. 1983.
Ericsson Review, vol. 59, No. 4, 1982, pp. 194–202.
"VT102 Video Terminal User Guide," Digital Equipment Corporation, 1981, pp. 17–19 and 97–98.

*Primary Examiner*—Parshotam S. Lall
*Assistant Examiner*—Ayni Mohamed
*Attorney, Agent, or Firm*—Fitzpatrick, Cella, Harper & Scinto

[57] ABSTRACT

An electronic typewriter system is composed of an electronic typewriter, a document data memory, a display unit, a print format modifying unit and an editing unit. In response to the entry of a stop code the system automatically changes the character-by-character mode to the line-by-line mode to enable printing when a line of document is prepared.

6 Claims, 8 Drawing Sheets

DATA PROCESSING SYSTEM FOR AUTOMATICALLY CHANGING PRINTING MODES IN RESPONSE TO STORED COMMANDS

This application is a continuation of application Ser. No. 07/904,682, filed Jun. 26, 1992, now abandoned, which is a division of application Ser. No. 07/477,153, filed Feb. 8, 1990, now U.S. Pat. No. 5,155,804, issued Nov. 13, 1992, which is a continuation of application Ser. No. 07/357,625, filed May 25, 1989, now abandoned, which is a continuation of application Ser. No. 06/929,496, filed Nov. 12, 1986, now abandoned.

BACKGROUND OF THE INVENTION

1. Field of the Invention

The present invention relates to an electronic typewriter system for processing text data entered from an electronic typewriter.

2. Related Background Art

In a conventional electronic typewriter, text data prerared by the operator are stored in an internal memory, and are printed charatcter by character or line by line, in response to a print command entered from a keyboard or the like. Thus, in case of preparing a new text by editing texts stored for example in a memory, the text is printed to a necessary position, then replenished by the entry from the keyboard of the electronic typewriter, and is completed by printing from the memory in a printing mode.

Recently, there is developed an electronic typewriter system in which text editing is conducted by displaying text data, prepared in the electronic typewriter, on external display means such as a cathod ray tube display unit. In such electronic typewriter system, the file retrieval of a user memory is conducted in the following manner. At first a menu is displayed on the cathode ray tube display, and a file retrieval command is entered from the keyboard of the electronic typewriter. Then an access is made to an external memory, such as a floppy disk, constituting a user memory, and a list of file titles is displayed on said cathode ray tube. Then the user enters a command for selecting a desired file, from the keyboard. In response, an access is made to the corresponding file, and the content is displayed on the cathode ray tube. Then the user initiates the editing operation of the file, after confirming that the selected file is a disired one.

Some of such electronic typewriter systems are capable of preparing a particular list from information of individuals stored in an internal or external memory, based on data of age entered from the keyboard, thereby efficiently printing direct mails.

In such conventional electronic typewriter systems, the entry of a stop code, for setting a manual input mode, executes the printing up to a character code immediately preceding said stop code and automatically the manual input mode (typewrter mode). However, in such case, if a selector switch on the electronic typewriter is positioned at a character-by-character (C/C) mode, said printing operation is executed immediately so that the advantage of the elctronic typewriter system is significantly reduced. Though it is possible to connect text data, entered from the electronic typewriter in the typewriter mode, to text data that have been processed prior to the entry of the stop code, it may not be able to provide a neat document to follow the text data entered in the typewriter mode with already entered text data after the typewriter mode is cancelled since the positions of word wrap and justification functions instructed before said mode cancellation are inevitably displaced.

Also in conventional electronic typewriter systems, the electronic typewriter and an external display unit have to be connected through an interface such as RS-232C, and such connecting function has been available only in high-classed electronic typewriters. Consequently low-priced ones cannot allow text editing on the display so that the efficiency of text preparation becomes very low. Also in the connection through such interface, each equipment has to be equipped with a terminal for the interface, so that the equipment has to be inevitably large.

Also in the conventional electronic typewriter systems, a change in the line space or in the print form of text data stored in a text memory requires the entry of a command defined in each software. Thus, in a system not having such command, the print form is not easy to change and requires the addition of a new memory area for such commands, thus complicating the system structure and increasing the system cost.

Also the conventional electronic typewriter systems are incapable of data communication, unless a print obtained on the electronic typewriter itself is transmitted for example by a facsimile.

Furthermore, in the conventional electronic typewriter systems, the age data to be entered from the keyboard in relation to the personal information stored in the external memory have to be renewed every year, and the operator is required to recall the information on the display and renew the age data after the birthday of each individual.

Furthermore, in the conventional electronic typewriter systems, if a file editing is interrupted for some reason and the retrieval of another file is conducted, the original file can only be recalled through the above-explained procedure, so that the efficiency of file retrieval is significantly deteriorated.

Furthermore, in case of storing a mail list, for example consisting of names and dates, in the text memory of the conventional electronic typewriter system, all the personal data have to be stored so that there is required a large memory capacity for storing the mailing data.

SUMMARY OF THE INVENTION

A first object of the present invention is to provide an electronic typewriter system capable, in response to the entry of a stop code, of changing the character-by-character (C/C) mode into the line-by-line (L/L) mode thereby executing a text printing when a line of text is completed.

A second object of the present invention is to provide an electronic typewriter system capable of correctly connecting text data stored in advance to text data prepared in said typewriter mode, after cancelling the typewriter mode.

A third object of the present invention is to provide an electronic typewriter system allowing editing, on external display means, of text data entered from an arbitrary electronic typewriter.

A fourth object of the present invention is to provide an inexpensive electronic typewriter system capable of editing text data stored in a text memory through a print form fuction specific to each electronic typewriter.

A fifth object of the present invention is to provide an electronic typewriter system capable of transmitting text data prepared for example in an electronic typewriter to a registered destination according to name information.

A sixth object of the present invention is to provide an electronic typewriter system capable of automatically age data at the access to personal information registered in an external memory.

A seventh object of the present invention is to provide an electronic typewriter system capable of exactly and time-sequentially retrieving text files prepared in the electronic typewriter with a simple operation.

An eighth object of the present invention is to provide an inexpensive electronic typewriter system capable of printing a mailing list with a minimum memory capacity.

DETAILED DESCRIPTION OF THE PREFERRED EMBODIMENTS

Now the present invention will be clarified in detail by embodiments thereof shown in the attached drawings.

Figure 1:
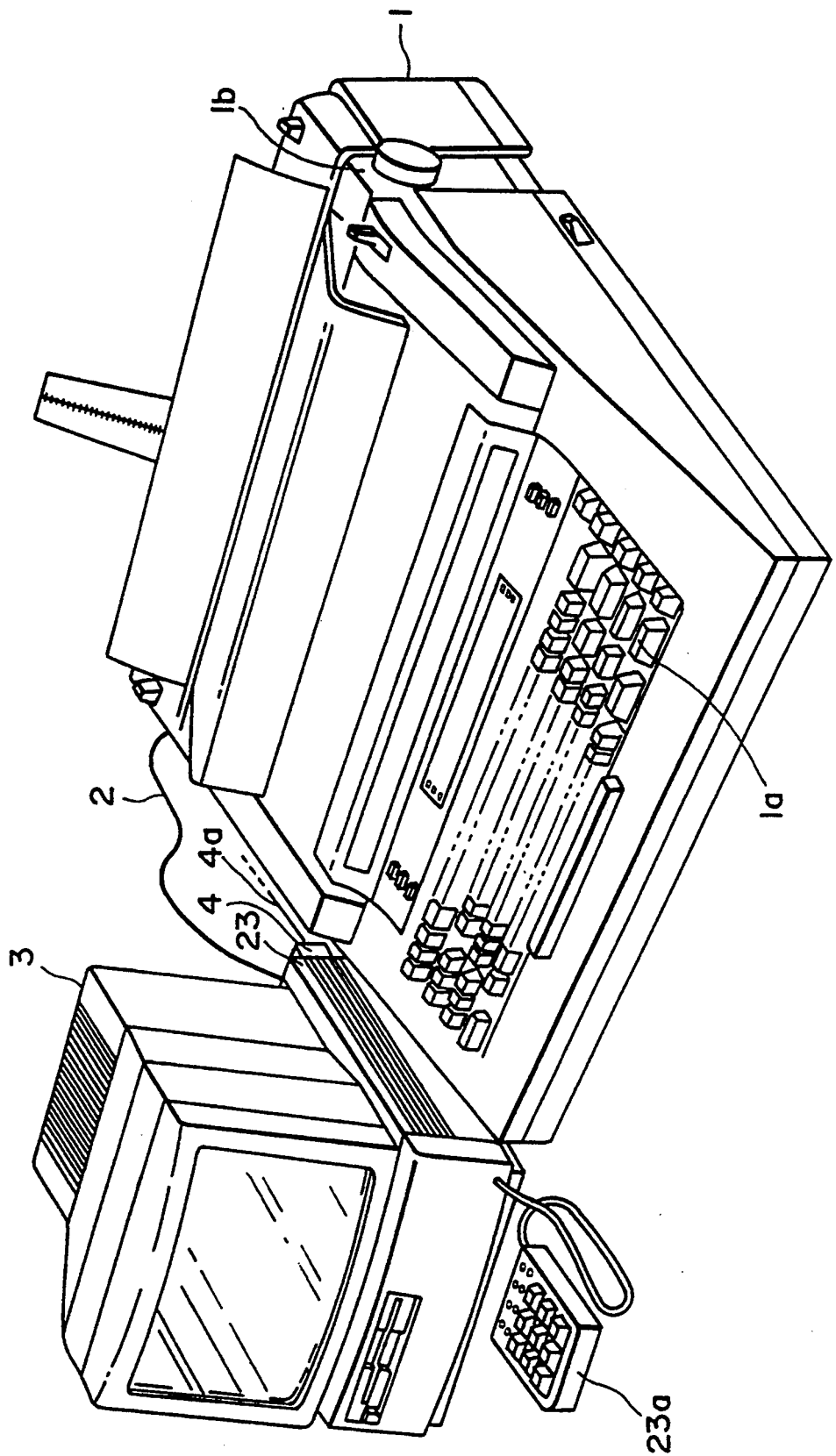
FIG. 1 is an external view of an electronic typewriter system embodying the present invention.

FIG. 1 is an external view of an electronic typewriter system embodying the present invention, wherein an electronic typewriter 1, composed of a keyboard 1a, a printer unit 1b, an interface 6 (FIG. 2) to be explained later, a CPU 1d (FIG. 2) etc. is connected, through a cable 2, to a cathode ray tube (CRT) display unit 3. The electronic typewriter 1 and the CRT display unit are controlled by different central processing units (CPU's). The CPU 14 of the CRT display unit 3 is capable, as will be explained later, of a text editing fuction, a text transmission control fuction, a mode change control fuction, a data communication control fuction, a data renewal function, a retrieval control function and a data processing function, editing text data displayed on the CRT display unit 13 according to the text data and editing commands entered through the keyboard of the electronic typewriter 1, and transferring thus edited text to the electronic typewriter 1. Though the present embodiment has only one electronic typewriter, it is also possible to connect plural electronic typewriters or to connect an electronic typewriter equipped with an arbitrary CPU different from the CPU 1d of the electronic typewriter 1, to the CRT display unit 3 through the cable 2. An external connection terminal 4 allows a multi-channel commucication with an external computer through a communication line 4a such as a telephone line.

Figure 2:
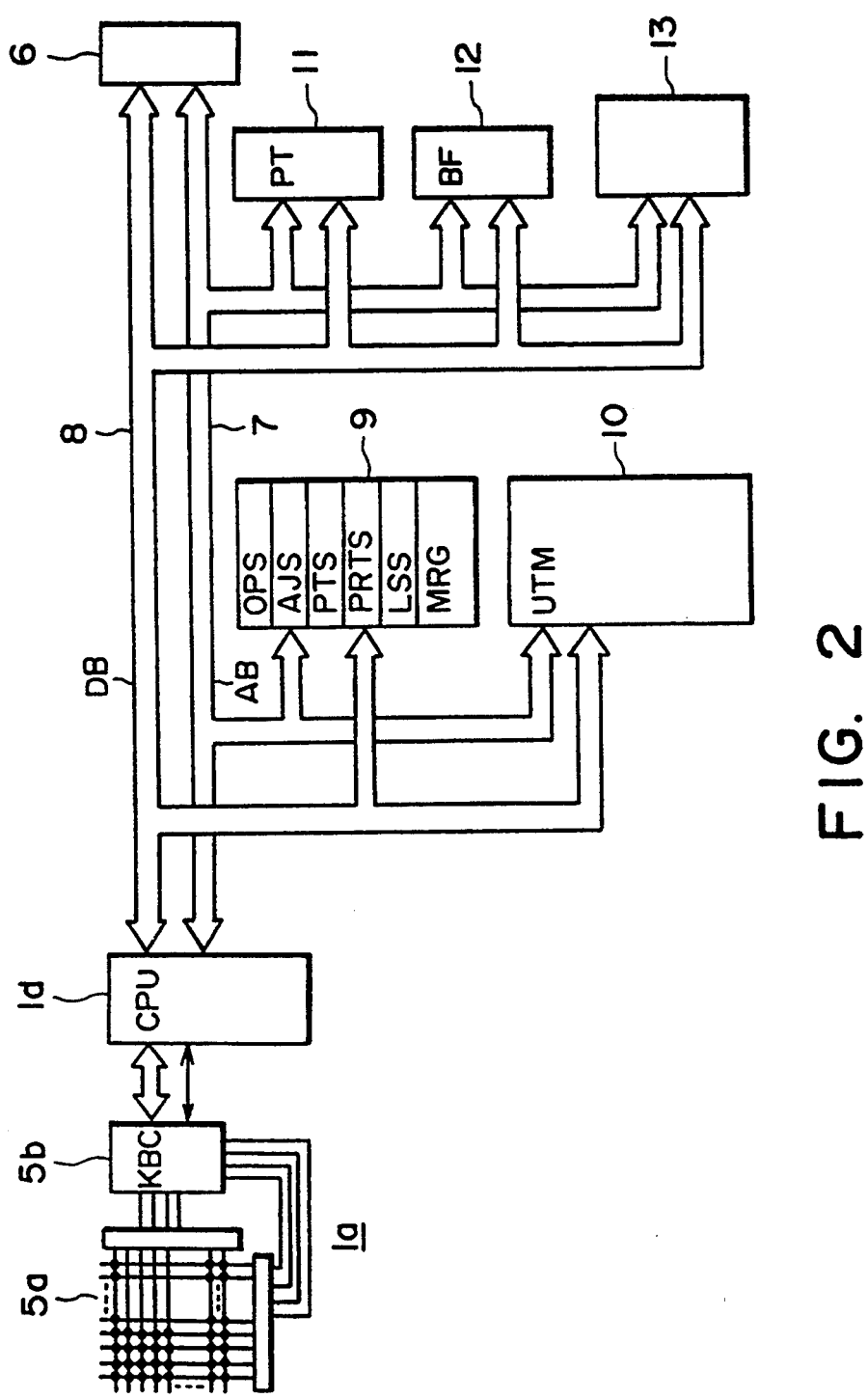
FIG. 2 is a block diagram of an electronic typewriter shown in FIG. 1.

FIG. 2 is a block diagram showing the structure of the electronic typewriter 1 shown in FIG. 1, wherein shown are a key matrix 5a constituting the keyboard 1a shown in FIG. 1; a keyboard controller 5b supplying the information of connection in said key matrix 5a to the CPU 1d; an interface 6 connected to the CPU 1d through an address bus 7 and a data bus 8; a status memory 9 area composed for example of a random access memory (RAM) and provided with an operation selector OPS, an auto/just selector memory area AJS, a pitch selector memory area PTS, a print selector memory area PRTS, a line space selector memory area LSS, and a margin memory area MRG: a user text memory (UTM) 10 for storing text data entered from the keyboard 1a for example with a memory capacity of 64 Kb; a pitch table (PT) 11 composed for example of a read-only memory (ROM) and storing print pitches; a buffer area (BF) 12 composed for example of a RAM and storing input/output (I/O) data; and a printer controller 13 for controlling the printer unit 1b.

Figure 3:
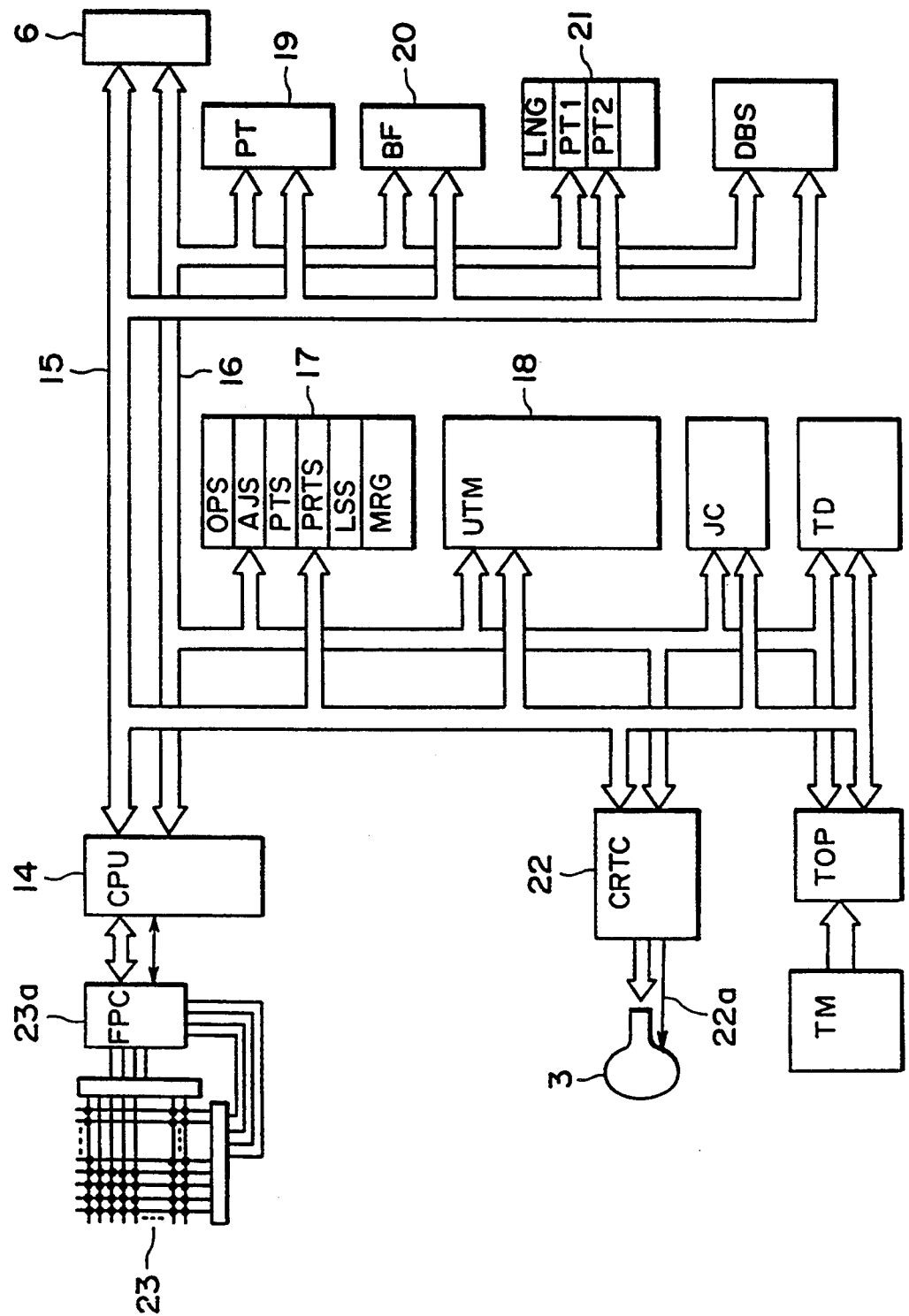
FIG. 3 is a block diagram of a cathode ray tube display unit shown in FIG. 1.

FIG. 3 is a block diagram showing the structure of the CRT display unit 3 shown in FIG. 1, wherein indicated are a CPU 14 which is independent from the CPU 1d and controls the CRT display unit 3; a data bus 15 connected to the data bus 8 shown in FIG. 2 through the interface 6; an address bus 16 connected to the address bus 7 shown in FIG. 2 through the interface 6; a status memory area 17 of a same structure as that of the status memory area 9 shown in FIG. 2; a user text memory 18 for storing text data entered from the keyboard 1a for example with a maximum memory capacity of 12 Kb; a pitch table (PT) 19 composed for example of a ROM and adapted for storing a print pitch; a buffer area (BF) 20 composed for example of a RAM and adapted for storing I/O data; a text data administration unit 21 composed for example of a RAM and consisting of a length area LNG for storing the length of print data, a current character address pointer PT1 and a printed character address pointer PT2; a CRT controller 22 provided with a video RAM and adapted for controlling data to be displayed on the CRT display unit 3; a synchronization signal 22a for controlling the signal input/output of the CRT display unit 3; a function matrix 23 connected to the CPU 14 through a function matrix controller 23a; a judgement code unit JC composed for example of a RAM and storing judgement codes for identifying the data content in the unit of each file; a timer circuit TM for sending time data to a time output circuit TOP: and a time data unit TD for storing the time of a file to be subjected to an access. The CPU 14 and the CPU 1d are so constructed as to mutually transfer or copy the data stored in the user text memory 18 and those stored in the user text memory 10, respectively. A name data base DBS stores telephone numbers to be addressed by a name information entered from the deyboard 1a, and also functions as a number memory in the present invention.

Figure 4:
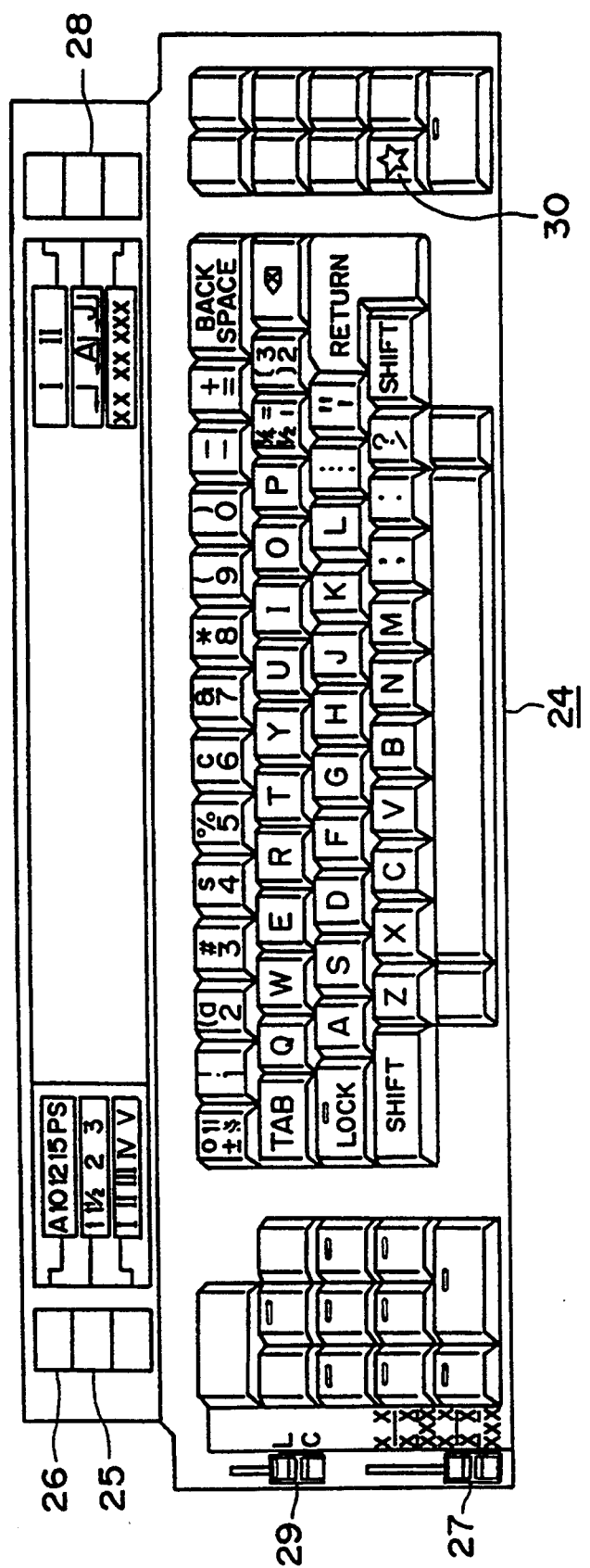
FIG. 4 is an enlarged plan view of a keyboard shown in FIG. 1.

FIG. 4 is an enlarged plan view of the keyboard 1a shown in FIG. 1, wherein shown are a keyboard body 24; a line selector key 25 for selecting a line space of 1, 1½, 2 or 3 inches in cyclic manner upon repeated actuation; a pitch selector key 26 for selecting a pitch of 10, 12 or 15 characters per inch in cyclic manner upon repeated actuations; a printer selector 27 for selecting the print form of underline; an auto adjust selector key 28 for selecting manual, automatic or just line feed mode; an operating selector 29 for selecting a character-by-character mode, at a position C, for executing a printing operation for each key actuation of the keyboard 1a, or a line-by-line mode, at a position L, for executing a printing operation when the character input of a line is completed; and a start key 30 for sending a stop code (control command) to the CRT display unit 3.

Figure 5:
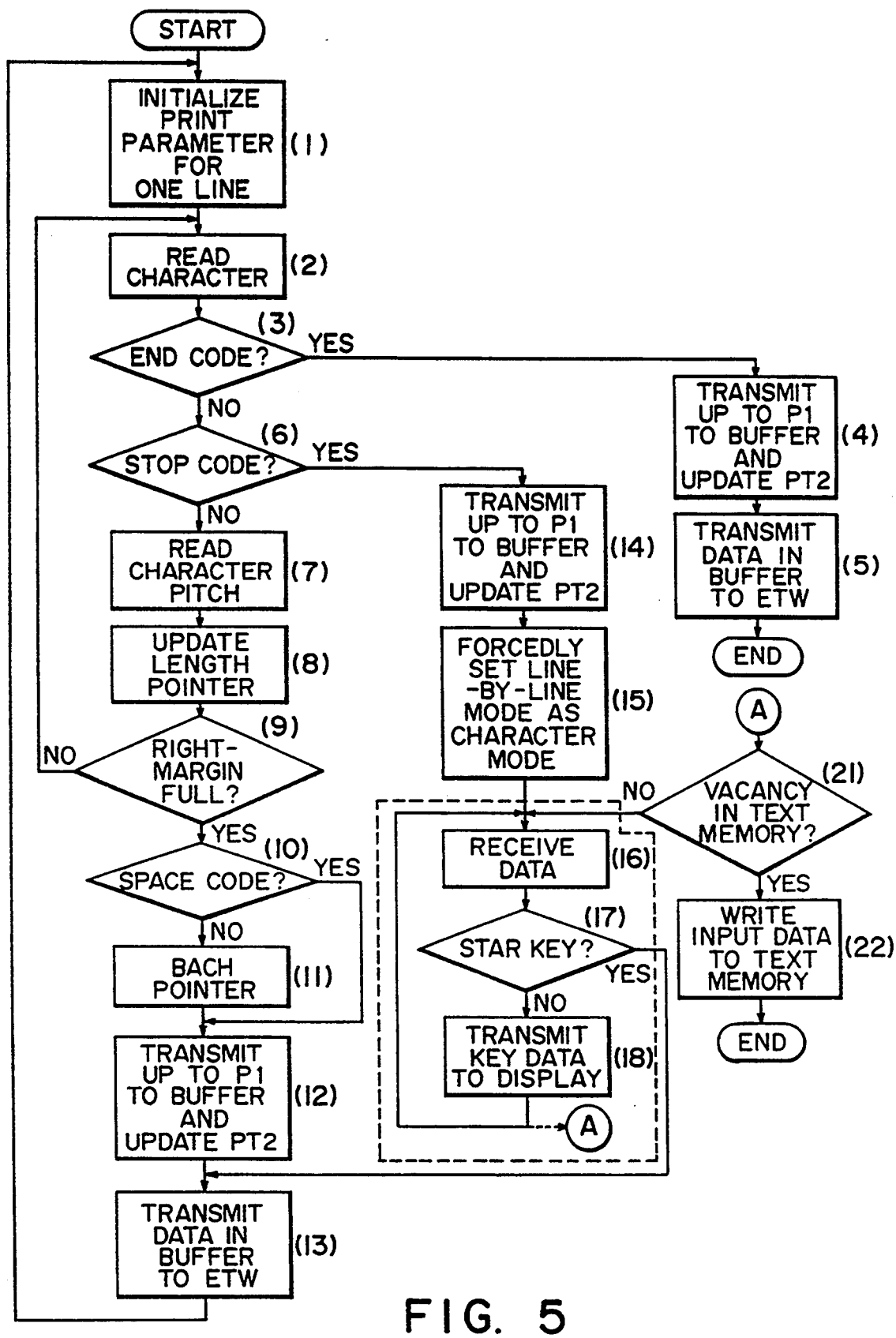
FIG. 5 is a flow chart of text editing and printing operations in the electronic typewriter system of said embodiment.

Now reference is made to a flow chart shown in FIG. 5, for explaining the text editing and printing operations of the electronic typewriter system of the above-explained embodiment, wherein (1) to (18), (21) and (22) are steps of the control sequence.

At first print parameters for a line are initialized by resetting the length counter LNG etc. to zero (step 1). Then character data of the user text memory 25 indicated by the current character address pointer PT1 are read (step 2), and there is made a discrimination whether thus read data are an end code (step 3). If affirmative, data from a position immediately following the printed character address pointer PT2 to a position indicated by the current character address pointer PT1 are transferred to the buffer 20 (step 4), then to the electronic typewriter 1 and the control sequence is terminated (step 5).

On the other hand, if the discrimination in the step 3 turns out negative, there is made a discrimination whether the read data are a stop code (step 6), and, if not, the character pitch is read from the pitch table 19 (step 7), and the contents of the length counter LNG and the current character address pointer PT1 are renewed (step 8). Then there is made a discrimination whether the right margin is already used up (step 9) and the program returns to the step 2 if the result is negative, while, if the result is affirmative, there is discriminated whether a space code is succeeding (step 10). If affirmative the program proceeds to a step 12, but, if negative, the current character address pointer P1 is reversed to a preceding word (step 11). Then the data from a position immediately following the indication of the printed character address pointer PT2 to a position indicated by the current character address pointer P1 are transferred to the buffer 20, and the content of said printed character address pointer PT2 is renewed (step 12). Then the data stored in the buffer memory 20 are transferred to the electronic typewriter 1 (step 13), and the program returns to the step 1.

On the other hand, if the discrimination in the step 6 turns out affirmative, the data from a position immediately following the indication of the printed character address pointer PT2 to a position indicated by the current character address pointer P1 are transferred to the buffer 20, and the content of said printed character address pointer PT2 is renewed (step 14). Then the character mode is forcedly changed to the line-by-line mode (step 15) and data from the keyboard 1a are fetched (step 16). There is discriminated whether the actuated key is the start key 30 (step 17), and, if affirmative, the program returns to the step 13, but, if negative, the data of the actuated key are transferred to the CRT display unit 13 (step 18) and the program returns to the step 16. After said step 18, there may be added steps 21, 22 to be explained in the following. After the step 18, there is discriminated whether the user text memory 18 has an empty area (step 21), and, if negative the program returns to the step 16 while, if affirmative, the electronic typewriter 1 is shifted to the typewriter mode and text data entered from the keyboard are transferred to the text memory 18 (step 22).

In this manner, even if the character-by-character mode is selected in advance, entry of a stop code automatically changes the printing mode to the line-by-line mode, so that an arbitrary text can be inserted into an already existing text. Also such insertion can be achieved precisely since the printing operation is suspended until a line of the text is completed. Also in case the auto-just selector key 28 is selected, text data stored in the user text memory 25 are automatically read and connected after the editing operation is completed.

Figure 6A:
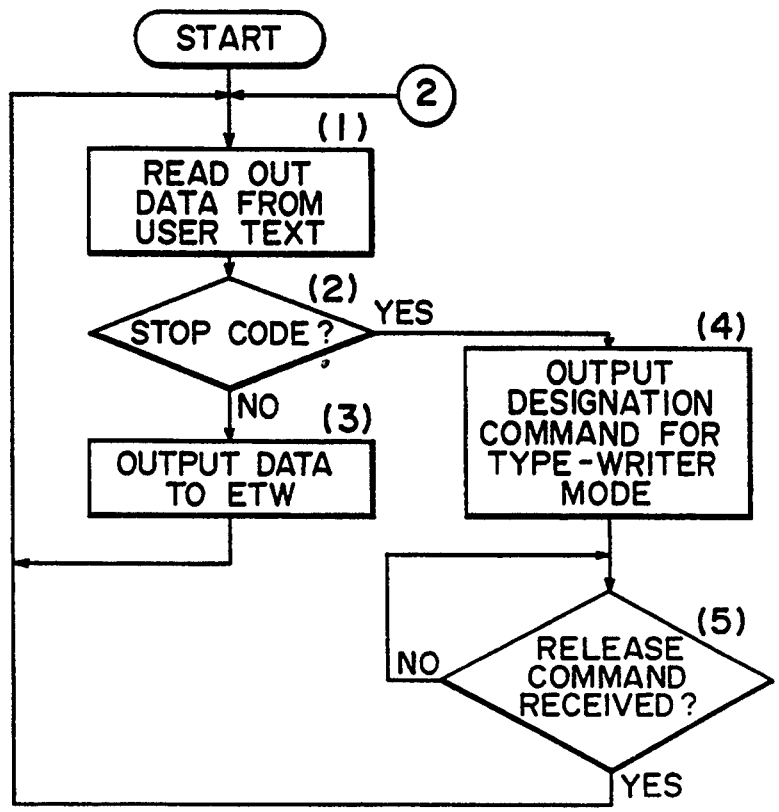
FIG. 6A and 6B are flow charts of a text transmission control operation of the electronic typewriter system of said embodiment.
Figure 6B:
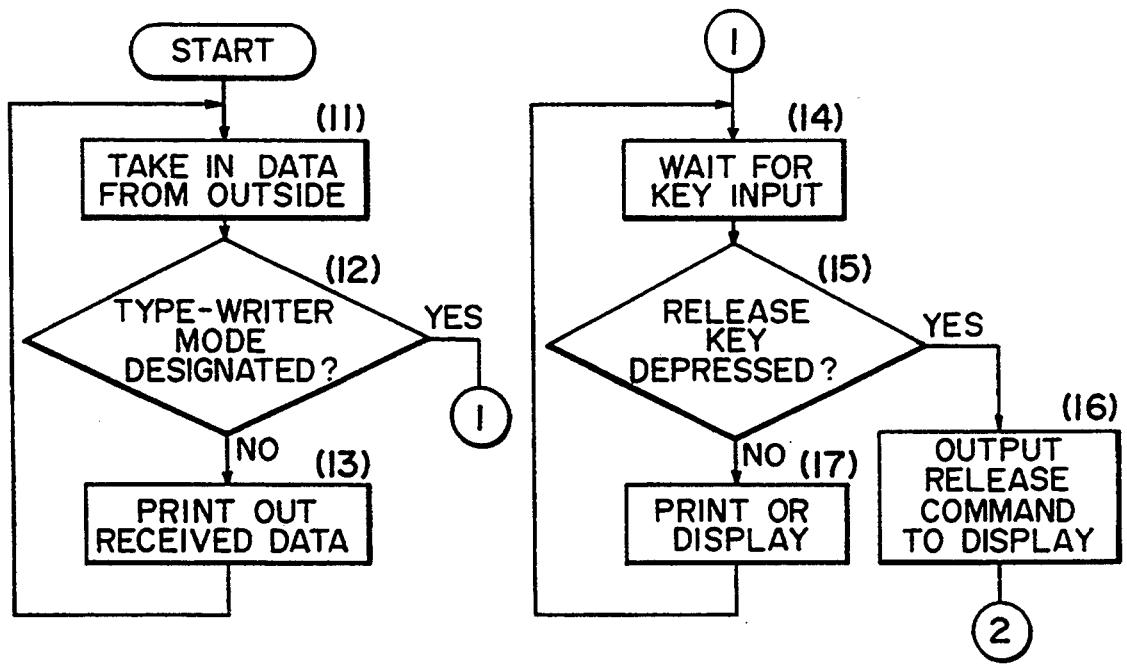

Now reference is made to FIGS. 6A and 6B for explaining a text trasfer control operation in the present invention.

FIGS. 6A and 6B are flow charts of the text transfer control operation of the electronic typewriter system of the foregoing embodiment, wherein steps (1)–(5) constitute a control sequence for the CRT display unit 3, while steps (11)–(17) constitute a control sequence for the electronic typewriter 1. A stop code is given as a control command for stopping the function of the printer unit 1b.

The CRT display unit 3 starts to function according to a sequence shown in FIG. 6A. At first data are read from the user text memory 18 (step 1), then there is discriminated whether thus read data are a stop code (step 2), and, if negative, said data are supplied to the electronic typewriter 1 (step 3) and the program returns to the step 2. On the other hand, if the discrimination turns out positive, a typewriter mode designating command is sent to the electronic typewriter 1 (step 4), then the program awaits the entry of a release command generated by the actuation of the release key (step 5), and returns to the step 1 upon reception thereof. Consequently the electronic typewriter 1 is detached from the CRT display unit 3 and functions by itself until the release command is received.

On the other hand, the electronic typewriter 1 starts to function according to the sequence shown in FIG. 6B. At first data are fetched from the outside (step 11), then there is discriminated whether the typewriter mode is designated (step 12), and, if negative, the received data are printed in the printer unit 1b (step 13) and the program returns to the step 11. On the other hand, if said discrimination turns out affirmative, a key input from the keyboard 1a is awaited (step 14), then there is discriminated whether the release key is actuated (step 15), and, if affirmative, a release command is sent to the CRT display unit 3 to initiate the sequence shown in FIG. 6A (step 16). On the other hand, if said discrimination turns out negative, a printing or displaying operation is conducted according to the key input from the keyboard 1a (step 17) and the program returns to the step 12.

Figure 7:
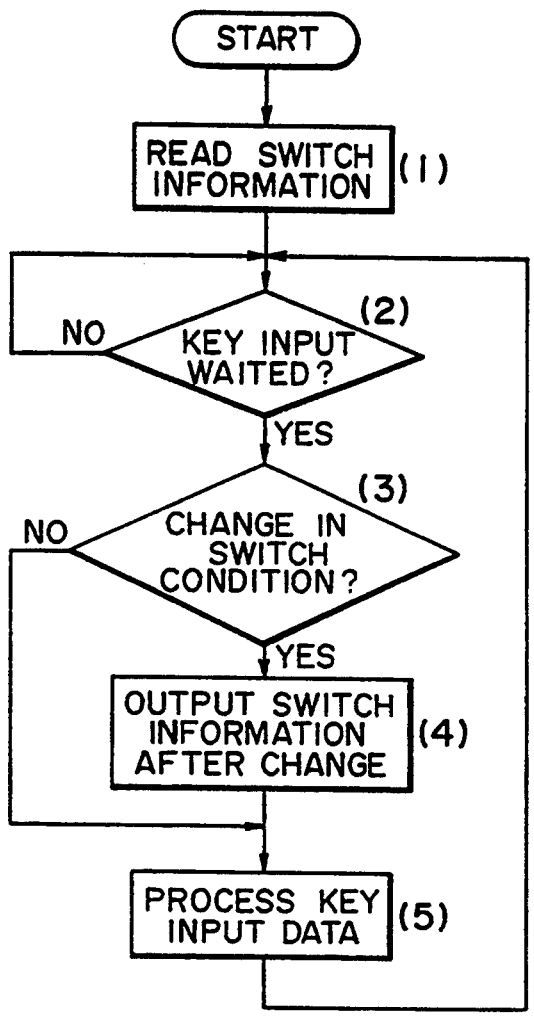
FIG. 7 is a flow chart of a mode change control operation of the electronic typewriter system of said embodiment.

Now reference is made to FIG. 7 for explaining a mode change control operation of the electronic typewriter system of the present invention, wherein (1) to (5) represent process steps.

At first switch information (information for emphasis such as line space and underline) of the keyboard 1a of the electronic typewriter 1 are read by the CPU 14 of the CRT display unit 3 (step 1) and are released. Then a key input from the keyboard 1a is awaited (step 2), and, in response to such key input, there is discriminated wheter the switch information has been changed (step 3). If negative the program proceeds to a step 5, while, if affirmative, the changed switch information is released (step 4), then the key input data are processed according to said changed switch information and the program returns to the step 1.

Figure 8:
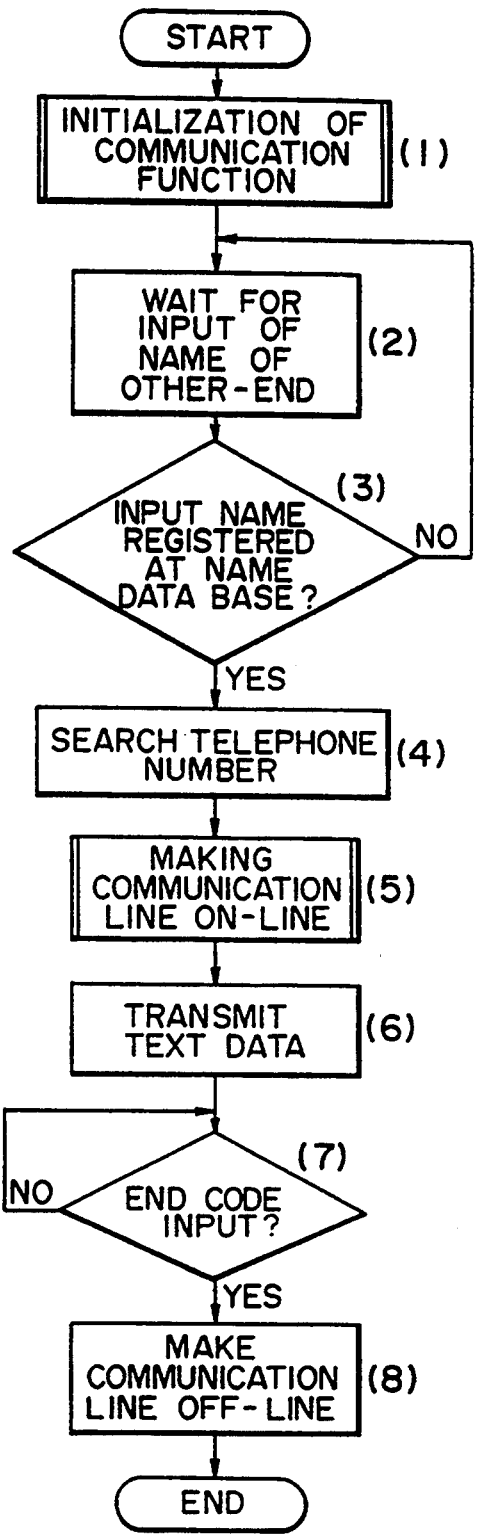
FIG. 8 is a flow chart of a data communication control operation of the electronic typewriter system of said embodiment.

Now reference is made to FIG. 8 showing a flow chart of a text data communication control operation in the electronic typewriter system of the foregoing embodiment, wherein (1) to (8) indicate process steps.

In response to a communication command from the keyboard 1a, there is conducted an initialization for the communication (step 1). Then the program awaits the entry of the name of a destination of communication (step 2), then there is discriminated whether the entered name is included in the registered name data base, and, if negative (step 3), the program returns to the step 2. In this case a new name registration into the name data base DB is conducted through the keyboard 1a. On the other hand, if the discrimination in the step 2 turns out affirmative, the telephone number corresponding to the entered name is retrieved from the name data base (step 4), and the communication channel 4a is set to the on-line state (step 5). This is achieved by automatic dialing according to the telephone number found by the CPU 1d. Subsequently, in response to a text data transmission command, the text data entered from the keyboard 1a and stored in the user text memory 16 are transmitted through the communication channel 4a (step 6). Then there is awaited the entry of an end code indicating the completion of text data communication (step 7), and, in response to the entry of said end code, the communication channel 4a is separated from the electronic typewriter 1 (step 8).

When the on-line state of the communication channel 4a is set by the step 5, the data entered from the keyboard 1a may be communicated for example to a personal computer or an electronic typewriter connectable with a modem, and in this manner text data can be transmitted from the keyboard 1a during the on-line state.

Figure 9:
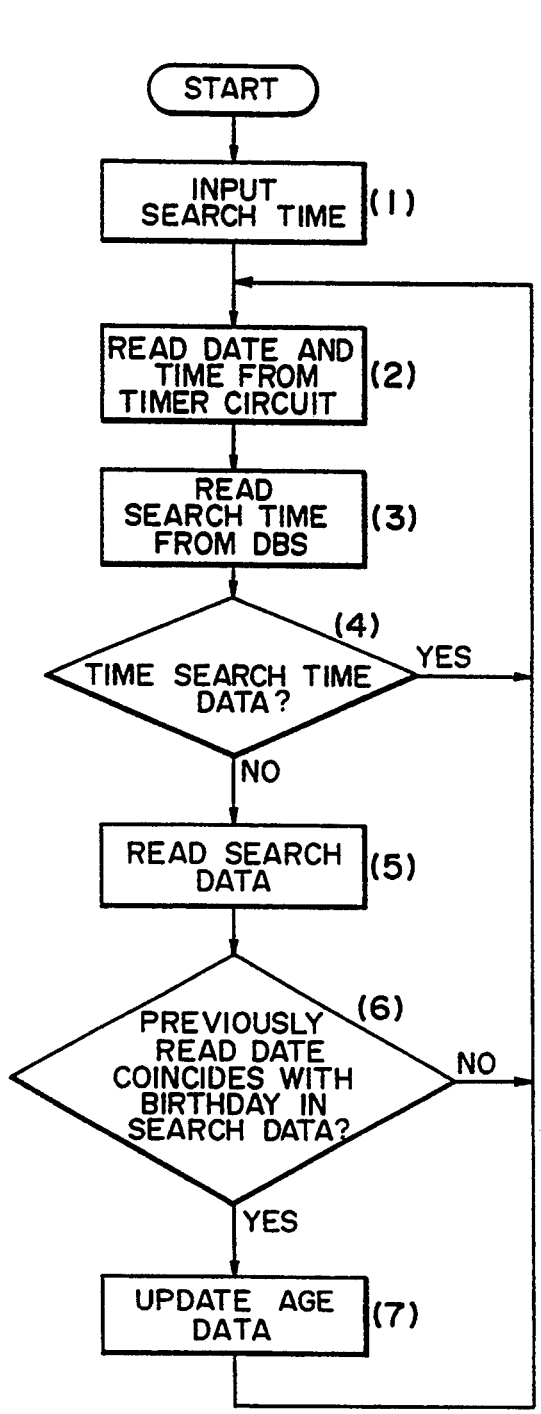
FIG. 9 is a flow chart of a data renewal operation of the electronic typewriter system of said embodiment.

Now reference is made to FIG. 9 showing a flow chart of a data renewal control sequence in the electronic typewriter system of the foregoing embodiment, wherein (1) to (7) indicate process steps.

A time to be retrieved is entered from the keyboard 1a (step 1), then date and time are read from the timer circuit TM of the CPU 21 (step 2), and the time to be retrieved is detected from the data base DBS of personal information (step 3). Then there is discriminated whether the time of said timer circuit is smaller than the time to be retrieved (step 4), and, if the result is affirmative, the program returns to the step 2, while, if the result is negative, data are retrieved from the data base DBS including age information (step 5). Then there is discriminated whether the date fetched in advance corresponds to the birthday of the retrieved data (step 6), and, if not, the program returns to the step 2, but, if affirmative, an age is calculated from the current date and the birthday and the age data is renewed (step 7) and the program returns to the step 2.

In this manner the age of each individual is automatically renewed at the retrieval.

Figure 10:
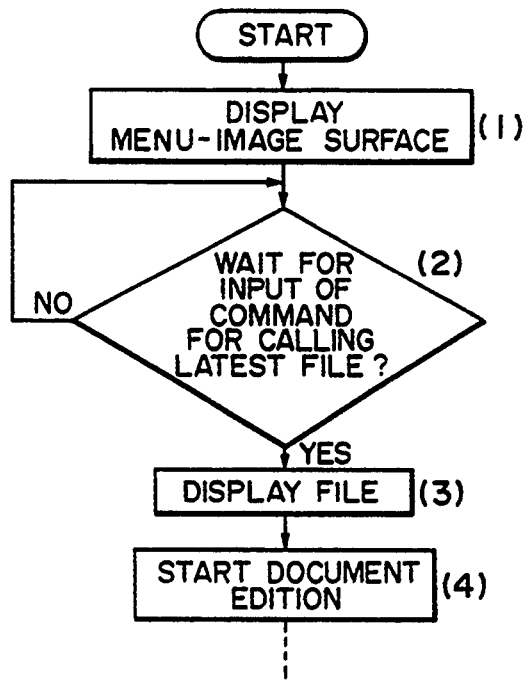
FIG. 10 is a flow chart of a text retrieval control operation of the electronic typewriter system of said embodiment.

In the following reference is made to FIG. 10 showing a flow chart of a text retrieval control sequence in the electronic typewriter system of the foregoing embodiment, wherein (1) to (4) indicate process steps.

At first a menu is displayed on the CRT display unit 3 (step 1), and the program awaits the entry of a latest file call command generated by the actuation of a particular key of the keyboard 1a (step 2). Upon entry of said command, the CPU 21 makes an access to a judgement code JC shown in FIG. 3, thus displaying a file stored in a memory area and indicated by said code JC (step 3) and initiating for example text editing (step 4).

It is rendered possible to call the files time-sequentially on the display unit 3 by controlling the pointer so as to designate a file stored immediately before upon each entry of said command. Also the pointer may be so controlled as to designate the files in succession from the oldest one. In this manner it is rendered possible to retrieve a desired file and efficiently restart the text preparation or editing, even when the text preparation or editing is interrupted.

Figure 11:
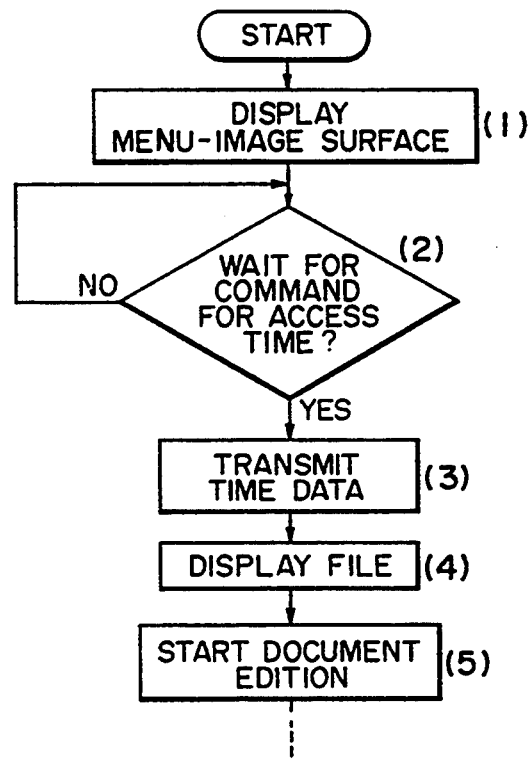
FIG. 11 is a flow chart of a data processing operation of the electronic typewriter system of said embodiment.

Now reference is made to FIG. 11 showing a flow chart of a data processing operation in the electronic typewriter system of the foregoing embodiment, wherein (1) to (5) indicate process steps.

At first a menu is displayed on the CRT display unit 3 (step 1), and the program awaits the entry of a command, from the keyboard 1a, indicating an access time for the file (step 2). In response to the entry of particular time data, the CPU 21 releases time data entered to the time output circuit TOP (step 3). Then an access is made to the time data unit TD to read the address of a corresponding file and a file stored in the predetermined memory area is displayed in the CRT display unit 3 (step 4), thus initiating for example text editing (step 5). In this operation the CPU 21 compares the current time supplied from the timer TM with the time of access to said file, and may display a suitable message such as "How are you?" or "It is a long time since we met before" according to the length of time between the current access and the preceding access. If the registered text is for example a letter, such message will give a suggestion on the starting portion of text to the user.

Such administration, based on time, of the files registered in the memory area allows time-sequential retrieval of such files.

The electronic typewriter system of the present invention, being capable of forcedly changing the printing mode to the line-by-line mode even if the character-by-character printing mode is initially selected, enables an efficient text editing operation by preventing a character-by-character printing operation during text editing, and also allows, after the typewriter mode is cancelled, to exactly connect text data stored in advance to text data prepared in said typewriter mode.

Also, though the electronic typewriter and the display unit have independent CPU's, the text data displayed on the display unit can be easily edited from the electronic typewriter and can be transferred, after editing operation, to a text memory of the electronic typewriter, so that the memory of the electronic typewriter can be efficiently utilized. Furthermore said system can be utilized as a printer as it can process text data transmitted through a communication line.

Furthermore the electronic typewriter system of the present invention can easily vary the print form of the text data stored in the text memory, without requiring an additional memory exclusive for the commands for changing the print form.

Furthermore the electronic typewriter system of the present invention is capable of transmitting text data, prepared on the electronic typewriter, to a destination dialed according to an entered name information, and transmitting or receiving text data by the electronic typewriter or the display unit, thus significantly amplifying the functions of the electronic typewriter.

Also it is capable of automatically renewing age data of registered personal information at the time or retrieval, and is therefore capable of precisely administering the age data of personal information and providing highly reliable personal information.

Furthermore, it is capable of retrieving text data in the unit of each file according to input time data and retrieving the files in succession in response to each retrieval command entered from the keyboard, thus enabling to find desired text data without a text selection on a menu.

Finally, it is capable of storing text data with a minimum memory capacity and inserting an arbitrary portion of text data stored in the text memory into other text data, thus significantly improving the efficiency of text editing.

What is claimed is:

1. An information processing system comprising:
   input means for inputting text data including command data therein;
   first setting means for manually setting one of a plurality of print modes, each of the print modes determining respective unit data for printing;
   memory means for storing the text data including the command data inputted by said input means;
   reading means for serially reading out the text data to be printed from said memory means;
   printing means for printing the text data read out by said reading means;
   determining means for determining whether the text data read out by said reading means includes the command data before printing the text data by said printing means;
   second setting means for interpreting the command data included in the read out text data and setting a predetermined one of the plurality of print modes corresponding to the interpreted command data irrespective of the current print mode set manually by said first setting means when said determining means determines the text data includes the command data; and
   print control means for controlling said printing means to print the text data in the predetermined print mode if the predetermined print mode has been set by said second setting means, and if the predetermined print mode is not set by said second setting means, said print control means controls said printing means to print the text data in the print mode set by said first setting means.

2. An information processing system according to claim 1, wherein said setting means sets a line-by-line mode or a character-by-character mode.

3. An information processing system according to claim 2, wherein said interpreting means sets the line-by-line mode corresponding to the command data for suspending printing of the text data, irrespective of the current print mode.

4. A method for processing information comprising the steps of:
   inputting text data including command data therein;
   storing the inputted text data including command data in a memory;
   setting a first print mode from a plurality of print modes manually, each of the print modes determining respective unit data for printing;
   reading out the text data to be printed from the memory serially;
   determining whether the read out text data includes the command data before printing the text data;
   printing the text data read out from the memory in the first print mode when the text data is determined not to include the command data;
   interpreting the command data included in the read out text data when the text data is determined to include the command data;
   setting a second print mode from the plurality of print modes corresponding to the interpreted command data irrespective of the manually set first print mode when the command data is interpreted; and
   printing the text data read out from the memory in the second print mode if the second print mode is set.

5. A method for processing information according to claim 4, wherein a line-by-line mode or a character-by-character mode is set as the first print mode.

6. A method for processing information according to claim 4, wherein the line-by-line mode is set as the second print mode corresponding to the command data for suspending the printing of the text data, irrespective of the first print mode.

* * * * *

UNITED STATES PATENT AND TRADEMARK OFFICE
CERTIFICATE OF CORRECTION

PATENT NO. : 5,452,404  
DATED : September 19, 1995  
INVENTOR(S) : HIDEO MATSUZAKI, ET AL.

It is certified that error appears in the above-indentified patent and that said Letters Patent is hereby corrected as shown below:

SHEET 5 OF THE DRAWINGS

Figure 5,
        Step 11, "BACH" should read --BACK--.

Column 1,
        line 37, "first" should read --first,--.
        line 58, "(typewrter" should read --(typewriter--.

Column 2,
        line 10, "quently" should read --quently,--.
        line 12, "Also" should read --Also,--.
        line 66, "fuction" should read --function--.

Column 3,
        line 6, before "age" insert --renewing--, and change "at" to --via--.
        line 55, "etc." should read --etc.,--.

Column 4,
        line 65, "deyboard" should read --keyboard--.

Column 6,
        line 12, "Also" should read --Also,--.
        line 41, "quently" should read --quently,--.

UNITED STATES PATENT AND TRADEMARK OFFICE
CERTIFICATE OF CORRECTION

PATENT NO. : 5,452,404
DATED : September 19, 1995
INVENTOR(S) : HIDEO MATSUZAKI, ET AL.

It is certified that error appears in the above-indentified patent and that said Letters Patent is hereby corrected as shown below:

Column 7,
line 4, "negative" should read --negative,--.

Column 8,
line 61, "Furthermore" should read --Furthermore,--.
line 64, "Furthermore" should read --Furthermore,--.

Signed and Sealed this

Fifth Day of March, 1996

Attest:

BRUCE LEHMAN

Attesting Officer

Commissioner of Patents and Trademarks